United States Patent [19]
Greco

[11] 3,940,827
[45] Mar. 2, 1976

[54] LEAF VACUUMING ATTACHMENT FOR ROTARY LAWN MOWERS

[76] Inventor: Salvatore T. Greco, 7 Parkwood Lane, Dix Hills, N.Y. 11746

[22] Filed: Apr. 18, 1974

[21] Appl. No.: 461,987

[52] U.S. Cl. .................. 15/328; 15/338; 56/13.1
[51] Int. Cl.² .......................................... A47L 9/00
[58] Field of Search ............ 15/328, 334, 337, 338; 37/43 L; 56/13.1

[56] References Cited
UNITED STATES PATENTS

| | | | |
|---|---|---|---|
| 2,930,068 | 3/1960 | Evanson et al. | 15/328 X |
| 3,142,913 | 8/1964 | Jacob | 15/328 X |
| 3,286,376 | 11/1966 | Wildes | 37/43 L |
| 3,373,514 | 3/1968 | Forren | 15/328 X |
| 3,676,893 | 7/1972 | Smythe | 15/328 |
| 3,871,052 | 3/1975 | Luckcuck | 15/328 |

FOREIGN PATENTS OR APPLICATIONS 707,408    5/1966    Italy...................... 15/334

*Primary Examiner*—Stanley N. Gilreath
*Assistant Examiner*—C. K. Moore
*Attorney, Agent, or Firm*—Eisenman, Allsopp & Strack

[57] ABSTRACT

Conventional rotary lawn mowers have a rotating cutter blade traveling at high velocity. This invention relates to an attachment for forming an enclosed housing containing the conventional mower components to create a vacuum chamber with a single input port which may be coupled to a flexible conduit to suck up leaves and other debris within an extended area for collection in conventional bags.

10 Claims, 5 Drawing Figures

U.S. Patent   March 2, 1976   3,940,827
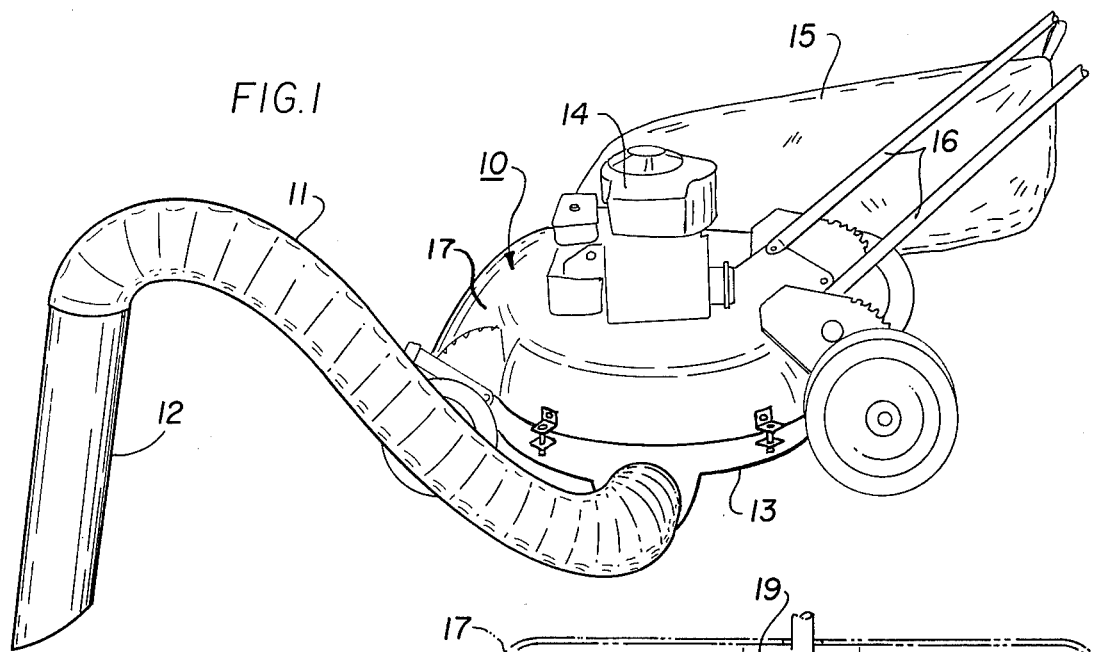
FIG.1
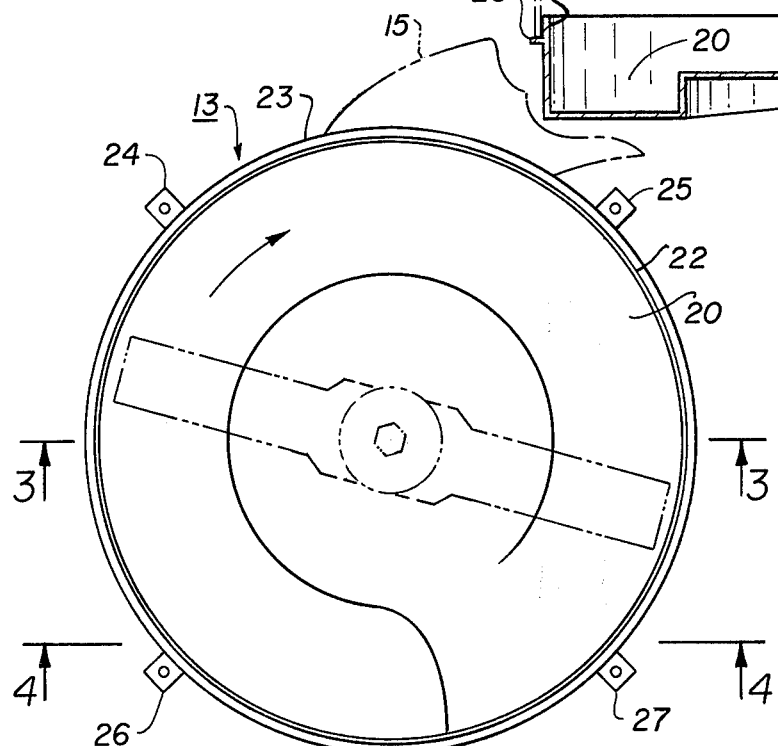
FIG.2
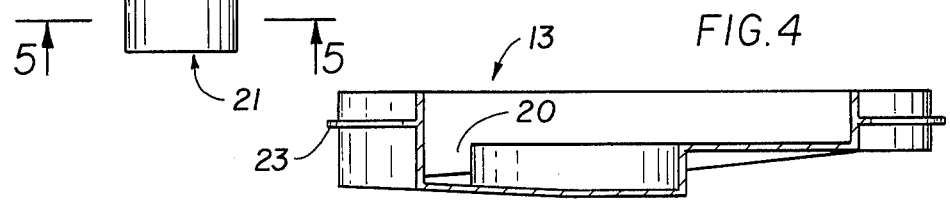
FIG.3
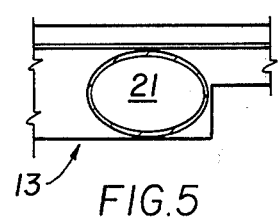
FIG.5
FIG.4

LEAF VACUUMING ATTACHMENT FOR ROTARY LAWN MOWERS

BACKGROUND OF THE INVENTION

1. Field of the Invention

This invention relates to improvement of equipment generally used in the nursery field; more particularly, it relates to an attachment for converting conventional rotary lawn mowers into mobile vacuums with hose-type pick-up elements.

2. Description of the Prior Art

It is recognized by all users of rotary lawn mowers that the rapidly rotating cutter blade creates some vacuum force when the housing is in close proximity to the ground. Such lawn mowers, however, rely principally upon the air flow created by rotation of the blade to transport cut grass and debris into the bagging attachment.

There is a need for equipment that will remove leaves and other light debris from flower beds, around shrubbery, and other relatively difficult to reach locations. Lawn cutting equipment, such as sickle-type lawn cutters, have occasionally included vacuum chambers to pick up the cut grass; but this does not help in removing debris from areas beyond the housing of the lawn cutters. There have also been modifications of rotary lawn mowers to make them function as sweepers and in some instances, the conventional flat blades have been replaced by fan blades; but, here too, no provision was made for gaining access to out-of-the-way areas.

To date, there are no known simple and economical attachments which can be used to rapidly convert the millions of existing rotary mowers into leaf vacuums capable of clearing flower beds and the like.

SUMMARY OF THE INVENTION

Structures embodying the present invention can be easily mounted or dismounted from conventional rotary mowers in order to create a vacuum chamber and provide the coupling for an input conduit. These attachments do not require modification of the existing rotary mower housing; nor do they require modifications or changing of the normal flat rotary cutting blades.

It is an object of the present invention to provide an attachment for convenient mounting and dismounting upon conventional rotary lawn mower housings.

It is another object of the present invention to provide an improved apparatus for developing a vacuum chamber from the existing housing of a conventional rotary mower.

Yet another object of the invention is to provide means for converting a conventional rotary mower into a mobile vacuum source suitable for coupling to a conduit which can be extended away from the lawn mower housing.

In accordance with one embodiment of the invention there is provided an attachment for use with a rotary lawn mower having an inverted superstructure with a rotating blade mounted for substantially horizontal rotation therein. The attachment comprises a walled pan having a periphery conforming with the lawn mower superstructure. A single input port is provided at one location on the peripheral wall of the attachment and it is coupled to the lawn mower housing to form a vacuum chamber.

A more complete understanding of the invention will be available from the following discussion which has been made in conjunction with the drawings.

BRIEF DESCRIPTION OF THE DRAWINGS

FIG. 1 is a perspective illustration of a conventional lawn mower with an embodiment of the invention assembled thereon;

FIG. 2 is a top view of a pan element embodying the invention, showing the relative position of a conventional lawn mower blade and discharge port in phantom outline;

FIG. 3 is a vertical cross-sectional view taken along the lines 3—3 in FIG. 2 and also showing relevant components of a conventional lawn mower in phantom outline;

FIG. 4 is a vertical cross-sectional view taken along the lines 4—4 of FIG. 2; and FIG. 5 is a partial vertical cross-section taken along the lines 5—5 of FIG. 2.

DESCRIPTION OF THE PREFERRED EMBODIMENT

The conventional rotary mower 10, illustrated in FIG. 1, includes, among other components: an inverted upper blade housing 17, handle 16, motor 14, and leaf bag 15. It is not important whether the motor is gasoline or electric powered. The attachment embodying the present invention is assembled beneath the rotary mower housing and coupled by clips, bolts, or similar means. The basic pan component 13, best seen in FIG. 2, includes an input port 21 to which one may couple a flexible conduit 11. It has been found advantageous to terminate such a conduit with a rigid section 12 for ease in handling. The length and dimensions of flexible conduit 11 with section 12 may vary as long as they are substantially air-tight.

FIG. 3 shows in phantom outline the usual configuration of the housing of a rotary lawn mower. Thus, the housing 17 usually has a circular configuration surrounding the tip path of a rotating blade 18 mounted upon the drive shaft. The housing 17 has a side wall which completely encloses the rotating blade, the entire unit being supported at selectable heights above the surface to be cut. One side of housing 17 includes a discharge port 19 to which the leaf bag 15 is mounted. As a result of rotation of the blade 18 grass is cut and the movement of air created by the blade along with impact of the blade upon the particles of debris, creates a flow of material into discharge aperture 19 and thence through the leaf bag 15. In general, this operation of the conventional rotary mower does not employ or develop any appreciable vacuuming effect.

The pan member 13 of the attachment is adapted to be sealingly engaged to the bottom of existing housing 17. A lip or shoulder 23 may extend completely around pan 13 and is held in butting contact with the bottom of the lawn mower housing. The upward extension 22 of the pan 13, is seated within the lawn mower housing and provides a snug substantially air-tight fit. The remainder of pan 13 is completely enclosed with the exception of the input port 21 on one side wall. As suggested in FIGS. 1 and 2 lugs 24 through 27 may be provided on both the pan and housing to bolt the units together. On the other hand, spring latches and couplings may also be suitably employed for this purpose. The lower surface of pan 13 is configured in order to produce a trough having its deepest portion at the inlet 21 and ascending to negligible proportions at approximately 270° therefrom. The center of the pan may be raised to restrict the total volume of the vacuum chamber and emphasize the chanel created about its circumference.

As a result of the sealable attachment of pan beneath the lawn mower, rotation of the blade 18 creates a vacuum force operative to suck air into port 21 and discharge it through pre-existing port 19 in the lawn mower housing. When used in conjunction with this equipment, leaf bag 15 must be air permeable in order to avoid build up of air and the creation of a back pressure at outlet port 19.

FIG. 5 suggests that the inlet port 21 may be of oval configuration. The specific cross-section of this port depends primarily upon the surface configuration of the inlet conduit 11. Flexible conduit 11 is available in cylindrical form and may be easily deformed into the oval or eliptical shape shown in FIG. 5. The restrictions upon this shape are principally the desire to avoid dragging the unit upon the ground. This is easily avoided by raising the mower with pre-existing elevating means to its highest position. There is no difficulty in rolling the assembled unit upon the lawn mower wheels.

It has been found desirable to position pan 13 with inlet 21 disposed approximately 180° from the discharge outlet 19. Nevertheless, it will be appreciated that in some applications, depending upon the configuration of the lawn mower being used, it may be desirable to modify this orientation to either 90° or 270° upstream, relative to the direction of rotation of cutting blade 18.

A particular embodiment of the invention has been shown and described. With this material in hand, those skilled in the art will immediately recognize modifications. Any such modifications coming within the scope of the following claims, are intended to be covered thereby.

What is claimed is:

1. A leaf vacuuming attachment for rotary lawn mowers which include a horizontal cutting blade rotating within an inverted housing with a circumferential vertical side wall containing a discharge port therethrough that is substantially tangential to said side wall, said attachment comprising: a closure pan having a circumferential vertical side wall substantially conforming to that of said housing, the upper edge portion of said pan side wall being configured for butting contact with the lower edge of said housing side wall; an input port in said pan side wall; and means for fastening said edges together to form an enclosed housing for said cutting blade, with said input port being below said cutting blade and rotated at least 90° upstream of said discharge port relative to the direction of rotation of said cutting blade.

2. A leaf vacuuming attachment as defined in claim 1, wherein the outer periphery of said pan side wall at the upper edge is slightly less than the inner periphery of said housing wall at the lower edge, said pan side wall including an external shoulder about the periphery and below the edge, said shoulder being held in engagement with the lower edge of said housing side wall by said fastening means.

3. A leaf vacuuming attachment as defined in claim 1, wherein the bottom surface of said closure pan includes a circumferentially extending trough of graduated depth, said trough being deepest in the vicinity of said input port and having a floor ascending towards said discharge port.

4. A leaf vacuuming attachment as defined in claim 3, wherein the outer periphery of said pan side wall at the upper edge is slightly less than the inner periphery of said housing wall at the lower edge, said pan side wall including an external shoulder about the periphery and below the edge, said shoulder being held in engagement with the lower edge of said housing side wall by said fastening means.

5. A leaf vacuuming attachment as defined in claim 1, further comprising a conduit coupled to said input port.

6. A leaf vacuuming attachment as defined in claim 5, wherein said conduit is flexible.

7. A leaf vacuuming attachment as defined in claim 5, wherein said conduit has a flexible section proximate to its coupling to said input port and a rigid section at the remote end thereof.

8. A leaf vacuuming attachment as defined in claim 5, wherein the outer periphery of said pan side wall at the upper edge is slightly less than the inner periphery of said housing wall at the lower edge, said pan side wall including an external shoulder about the periphery and below the edge, said shoulder being held in engagement with the lower edge of said housing side wall by said fastening means.

9. A leaf vacuuming attachment as defined in claim 8, wherein the bottom surface of said closure pan includes a circumferentially extending trough of graduated depth, said trough being deepest in the vicinity of said input port and having a floor ascending towards said discharge port.

10. A leaf vacuuming attachment as defined in claim 1, wherein said input port is rotated 180° upstream of said discharge port relative to the direction of rotation of said cutting blade.

* * * * *